Oct. 7, 1930.  C. G. ADSIT ET AL  1,777,952
ELECTRIC POWER SUPPLY SYSTEM
Filed May 12, 1927    2 Sheets-Sheet 1
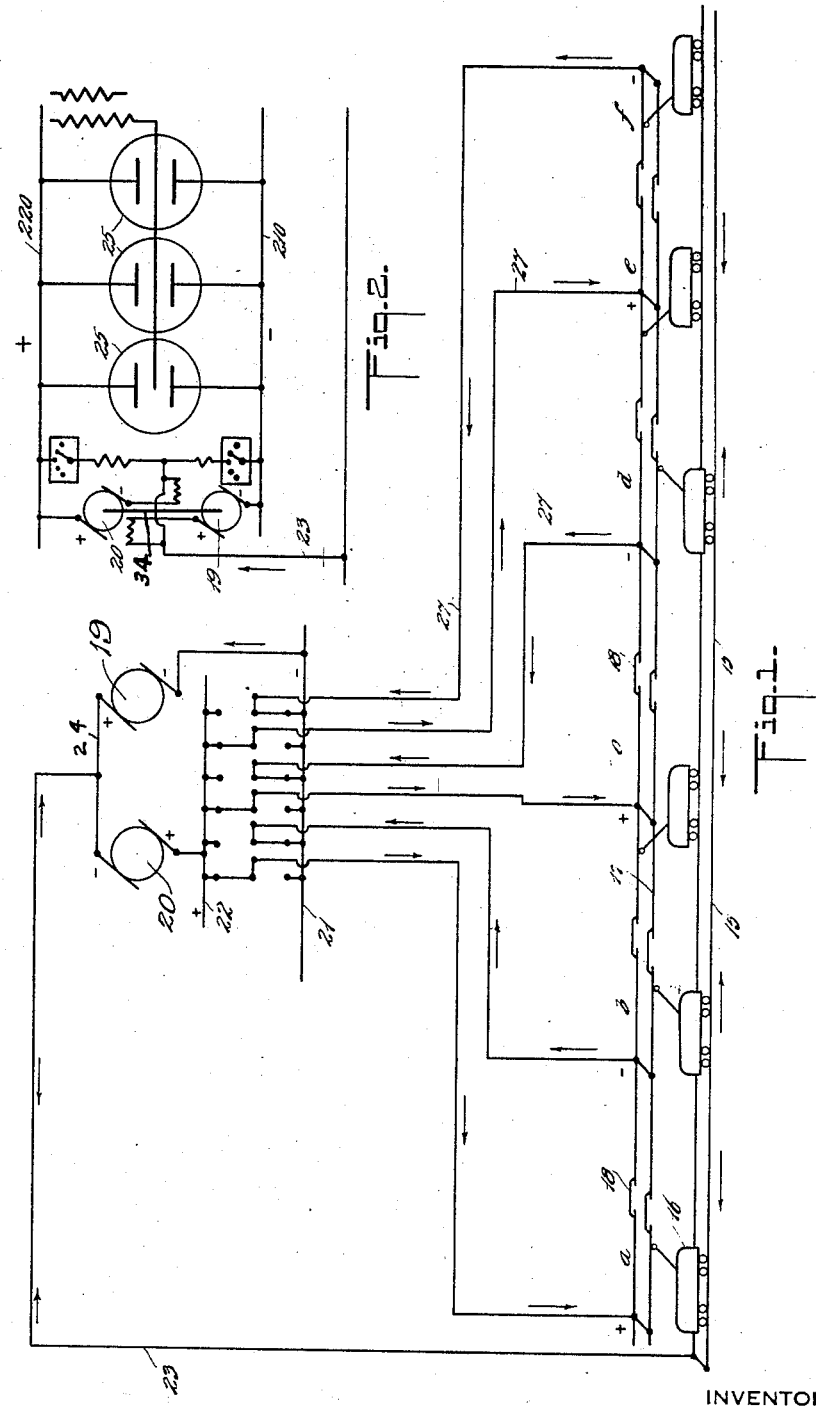
INVENTORS
CHARLES G. ADSIT
CHARLES E. BENNETT
by their attorneys
Howson and Howson Oct. 7, 1930.   C. G. ADSIT ET AL   1,777,952
ELECTRIC POWER SUPPLY SYSTEM
Filed May 12, 1927   2 Sheets-Sheet 2
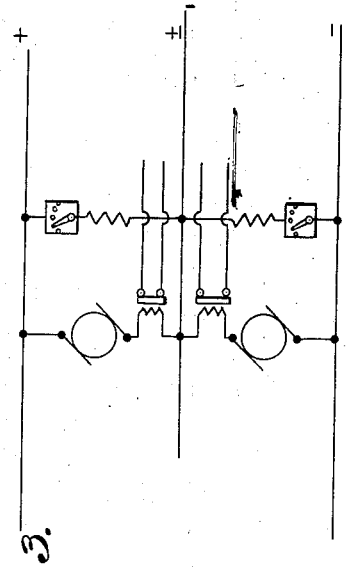
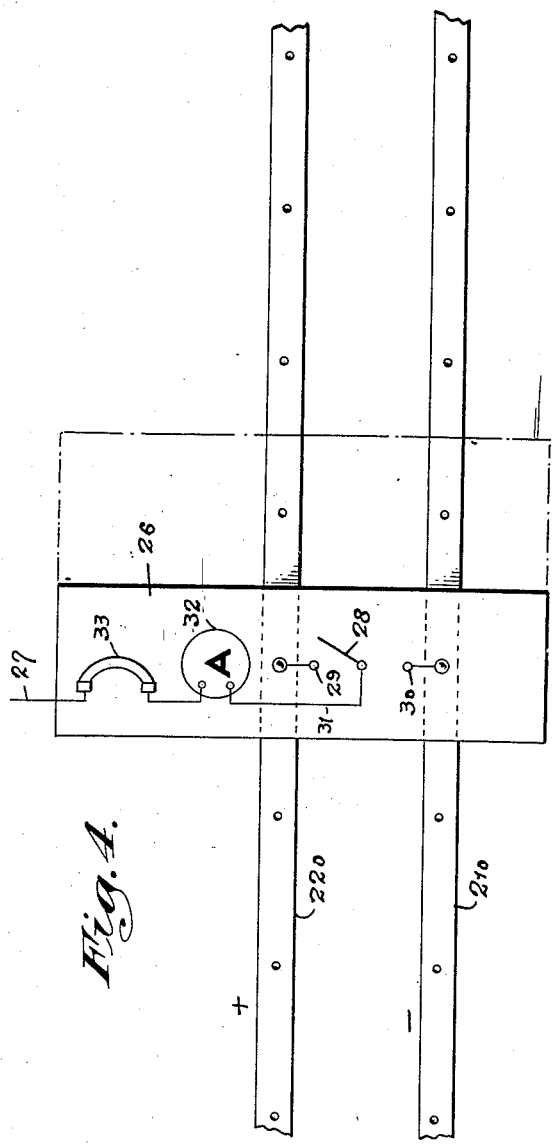
Inventors
CHARLES G. ADSIT
CHARLES E. BENNETT
By their Attorneys Patented Oct. 7, 1930

1,777,952

UNITED STATES PATENT OFFICE

CHARLES G. ADSIT, OF ANDREWS DRIVE, AND CHARLES E. BENNETT, OF DECATUR, GEORGIA

ELECTRIC POWER-SUPPLY SYSTEM

Application filed May 12, 1927. Serial No. 190,866.

Our invention relates to electric power supply systems, and particularly to a direct current supply system for electric railways.

Among the objects of our invention may be mentioned (1) To provide a sectionalized or zoned electric railway current supply system to which existing installations may be conveniently and advantageously converted;

(2) To provide a sectional or zoned trolley wire system, in which each trolley wire section or zone has its separate feeder, so that trouble on one section or zone will not interfere with the power supply to or operation of other sections or zones;

(3) To provide a power supply system of the track-return type, in which the current density of the track circuit is reduced to a minimum;

(4) To eliminate or minimize injury to rails, water pipes, gas mains, heating mains, power cables, telephone cables, bridges, and other structures;

(5) To minimize the flow of current in the track by maintaining a substantial balance between the power feeders of opposite polarity;

(6) To eliminate current losses in both the feeder and ground return conductors;

(7) To provide appropriate power station equipment and layout for the effective operation of the system.

Various other advantages will be hereinafter explained or will be clear to those skilled in the art, from the accompanying drawings, in which—

Fig. 1 is a diagram illustrating certain features of our invention;

Fig. 2 is a diagram illustrating a power station layout;

Fig. 3 is a diagram of modified balancing unit; and

Fig. 4 is a diagram of a panel control unit.

Referring to the diagram of Fig. 1, we have indicated at 15 a trolley track upon which run cars 16 provided with the usual D. C. motors which take their current from the overhead trolley wire 17. The trolley wire 17 is divided into sections or zones, $a$, $b$, $c$, $d$, etc., separated by section insulators 18.

The current supply to the trolley wire may be derived from a pair of generators 19 and 20 arranged in series, the generator 19 having its negative pole connected to the feeder line 21, while the generator 20 has its positive pole connected to the feeder 22. Connections from these feeders 21 and 22 are usually made to alternate sections of the trolley wire 17 by means of feeder leads 27. Thus sections or zones $a$ and $c$, Fig. 1, are connected to the positive feeder 22, while sections or zones $b$ and $d$ of the trolley wire are connected to the feeder 21 of negative polarity. The current flowing from the various sections or zones of the trolley wire through the motors of the several cars 16, enters the track 15, and the latter is connected through lead 23 to a neutral point intermediate the generators 19 and 20, that is to say, to a point in the series connection 24 between the generators.

While the current supply may be from generators 19, 20, we prefer to use these two machines as a balancing means to supply only a balancing current to keep the system in balance. When these generators are used as balancers the main source of current supplied to feeders 21, 22 may come from arc rectifiers 25 (see Fig. 2) or other well known sources of current such as are commonly used in high power installations.

The drawing in Figure 1 illustrates the fact that where there are two or more parallel tracks, their trolley wires are sectionalized alike, and parallel sections are connected to the same feeder and are therefore of the same polarity. We point this out with particularity since it is of practical importance from the standpoint of installation expense. Only standard insulation from supports is required.

Since the same source of power energizes both positive and negative feeders, and their respective trolley wire zones, the ground or track circuit is neutral to the source of power. The ground current in the track instead of flowing back to the source of power, as has heretofore been the practice, now flows only between cars on the same track in adjacent zones. This path is comparatively short and the ground current is consequently of relatively small value.

Moreover, the amount of current flowing in the track 15 will be only half what the same load would require in the usual feeding system, in which the entire feeder potential is returned to the generator through the track 15. This obviously results in a far lower power loss in the feeder, since as is well understood, current loss in transmission systems follows the law of the current squared times resistance. The result is very much lower density of current in the track circuit, and a great reduction in the length of the path of the current in the ground circuit, since the current does not return to the source of supply through the track. Inasmuch as the rail or ground circuit is of steel or iron, which is a metal of relatively high resistance, the reduction of current density in this portion of the circuit, or the restriction of the length of the current path therethrough, greatly reduces the current loss in this side of the circuit.

Moreover the difference of potential between the rails and other grounded structures is greatly reduced, due to the fact that the drop in potential in the rail circuit is reduced to a minimum. This results in the practical elimination of electrolysis, since the current flow from the rails to other structures, and the current flow from such structures back to the rails, is so reduced (in fact practically eliminated) that the cause of electrolysis is reduced to a minimum. There is also a reversal of polarity, since the flow of current in the rails is not always in the same direction, dependent upon the movement of cars on adjacent zones, and the distance between them. This also serves to reduce electrolysis.

The resistance offered by the track circuit, as above mentioned, is due to the relatively high resistance of the track metal, to the resistance of the track bonds, and to the length of the current path. This resistance causes a high loss when the current density is great, as it now commonly is, by reason of the flow of the entire ground current through the tracks back to the source of power. This loss is also proportional to the current squared times the resistance of the circuit. Consequently where the current density is great, the resistance loss is very high. On the contrary, in accordance with the present invention, the average current density in the rail circuit times the average length of its path, is only a small fraction of that now common in the usual track return circuit. If the current in the track circuit is reduced, for example to 10% of its normal value, then by reason of the fact that the losses are proportioned to the current squared, the current loss in accordance with the present system is only 1/100 of the loss experienced in the systems now in common use.

Again, drop of voltage in a conductor is proportional to the resistance of the conductor times the current value. Therefore, if the average track circuit is only 1/10 of its normal value, the voltage drop in this portion of the circuit is only 1/10 as great.

This great reduction of current value and voltage drop in the track circuit reduces the leakage of current from the track circuit into other paths, and these paths are only for the comparatively short length of track through which the current flows.

The sectionalizing of the trolley wire introduces no new problems in existing installations. All trolley wires (i. e. on parallel tracks) are of the same polarity in each section or zone, and are of the same potential difference above ground as in the usual system. No additional insulation is required on span wires or other supports than is usually employed. The only additions to the usual system are the section insulators or breaks installed in the trolley wires over which the trolley wheel or collector passes, thus requiring little cost for change to the present system. No change whatsoever is required in the track circuit.

The power apparatus at the source of power supply determines the potential difference between the trolley wire and rail, and maintains it constant by reason of the neutral ground connection. Where 600 volts are required between the trolley and ground or track, the power is transmitted at 1200 volts; while at the same time maintaining 600 volts between the trolley and track of any section. Breaks in the continuity of the rail circuit, due to faulty bonding, become of less importance than usual, as they affect only the track circuit of the section in which the break occurs, and do not affect the return circuit of the system as a whole. The reversal of current flow when the car crosses from one zone to another, does not reverse the motors or other devices on the cars, since the reversal of polarity causes no reversal of direction of the motor. Consequently car equipment may be standard.

In Fig. 2 we have indicated diagrammatically an appropriate station layout, although this is subject to wide variation. The power supplied to the feeders 21 and 22 is derived from arc rectifiers 25. This current is sufficient to take care of the line load. The balancing current supplied to the feeders 21 and 22 is derived from the generators 19 and 20, to which alone the track circuit 15 is connected at a point intermediate these series connected generators. Any unbalanced condition in the feeders is taken care of by the operation of these generators, the operation of which tends to restore the balance. As will be noted, the current in series field of generator 20 is derived from generator 19, and vice versa.

It will be apparent to those skilled in the art that the generators 19, 20 will operate as a motor generator set. The rotors of these generators are coupled together as shown at 24. Depending on whether there is a positive or negative current in balancing connection 23, either machine 19 or 20 will act as a motor and drive the other machine as a generator to deliver the balancing current to restore balance in the system as mentioned above.

Assuming that the system is connected as shown in Fig. 1 and with the generators 19 and 20 used as balancers and the main source of current derived from some means, as is shown in Figure 2, then the main current which drives the motors in the cars 16 will be delivered to the bus bars 21, 22 or 210, 220 from the source 25 and will go out from the bus bars through the positive feeders to the trolley wire zones from thence it will go down through the cars to the track then through the track to the adjacent zones of opposite polarity and up through the cars in those zones to the trolley line and negative feeder and back to the source 25. The only current that will pass through the tracks to the conductor 23 will be balancing current supplied by the generators 19 and 20 to counter balance any extra demand on the positive or negative feeder.

It has been found in practice that under normal conditions the system is in substantial or practical balance and therefore practically no current runs through the conductor 23. On that account the balancing connection to track need not necessarily be closed but may be open under normal conditions, any mild unbalanced condition being taken care of automatically by the normal operation of the generators or in other words such condition will be taken care of by an automatic shifting of the neutral point from the track to some place within one or the other of the generators, in the normal operation of the ordinary type of generators. Because the balancing current is practically negligible in amount, under normal conditions, the shifting of the neutral, if the balancing connection is open, is not harmful to the generators.

If the demand in a particular zone becomes particularly heavy and continued while some other zone of opposite polarity is under loaded continuously, then the switches between the bus bars 22, 21 and the feeders to those zones may be reversed. Thus a continuous unbalanced condition need not long prevail in our system since it is so easy to correct such condition.

In Fig. 3 we have indicated a modified layout in which the series field of each generator is subject to an automatic relay control. Various other balanced power layout arrangements will occur to those skilled in the art.

In Fig. 1 we have shown diagrammatically the connections for changing the polarity of the feeders at will, while in Fig. 4 we have pictured, diagrammatically, a station layout wherein bus bars 210 and 220 correspond to feeders 21 and 22.

A distributing panel is associated with the bus bars, a panel unit 26 being provided for each section of the trolley wire and the connection to the panel unit 26 being established through a lead 27 from the unit to the appropriate trolley wire section. Preferably the panel unit comprises a double throw switch 28 adapted to make connection with either the positive terminal 29 connected to bus 220, or the negative terminal 30 connected to the bus 210. The switch bar 28 is connected by shunt strap 31 with meter 32 and thence through automatic circuit breaker 33 to the zone feeder lead 27. The control of the entire series of trolley wire zones, or of such portion thereof as may be fed from the station, is thus readily effected by the station operator. This is not only of advantage during the operation of the system, since it enables the attendant to change the polarity of the trolley wire of any section by merely throwing the switch 28, but it is also of great advantage when changing over an established system to the present layout. In the latter case the switches 28 for the entire panel may be connected temporarily to one of the terminals 29 or 30, followed, when the installation is otherwise in readiness, by the shifting of alternate switches to the terminal of opposite polarity.

The present system has many advantages other than those mentioned above, such as dividing the load properly between sources of power supply; the elimination of all interference in other zones of the system when one zone is in trouble; the great reduction in temporary interruption of power supply; the reduction or elimination of return cables in the track circuit; the elimination of concentrated current flow in the track circuit where many branch lines combine or converge; the elimination of extra heavy bonding; greatly reduced danger to persons and objects on the breaking of trolley wires; the elimination of parallel cables to increase the conductivity of the track circuit; the reduction of liability of damage to power generating apparatus; the reduction of trouble incident to lightning or insulation failures; an extension of the distance to which the system may be carried economically from the source of power supply (or inversely, the reduction in number of locations where the source of supply must be available); the ease and economy with which the various sources of supply may be interconnected; and the general betterment of voltage conditions over the entire system.

With the understanding that our invention may be embodied in various layouts and equipment for obtaining the advantages stated, and further that the accompanying drawings are but diagrammatic indications of a layout merely illustrative of the thoughts which underlie what we claim as our invention.

We claim—

1. In an electric railway system of the D. C. type, mutually insulated trolley wire zones, mutually connected tracks therefor, a source of power, separate means for connecting each trolley wire zone to the source of power, some of said zones being of opposite polarity to other of said zones, whereby the current return is mainly through the adjoining zones and their connections to the source of power.

2. An electric railway system including a plurality of laterally adjacent tracks, a sectionalized or zoned trolley wire feeding each track, a source of power, and feeder connections between said source of power and each trolley wire zone, some of said zones being of opposite polarity to other of the zones in the same line, the connections between said zones and the source of power being such that no potential difference exists between the trolley wires for laterally adjacent tracks.

3. In an electric railway system of the D. C. type, mutually insulated trolley wire zones, each zone comprising a plurality of approximately parallel trolley wires being substantially at the same potential and adapted to serve a plurality of tracks, a ground connection for the several zones, a source of power, means for separately connecting each zone to the source of power, some of said zones being of opposite polarity to other of said zones, whereby the main return current is carried by the negative feeder and not by the ground connection except insofar as the return current travels through ground to a nearby zone of opposite polarity, and means for altering at will the polarity of any zone of the trolley wire independently of all the other zones.

4. In an electric railway system of the D. C. type, a source of power, mutually insulated trolley wire zones each connected to the source of power by a separate feeder, a ground connection for the several zones, a balancing connection to the ground connection, some trolley wire zones being of opposite polarity, whereby the current return is mainly through the adjoining zones and their connections to the source of power.

5. In an electric railway system of the D. C. type, mutually insulated trolley wire zones, a ground connection for the several zones, a source of power including a balancing connection to the ground connection designed to equalize the load on the several trolley wire zones, means for separately connecting each trolley wire zone to the sources of power, some of said zones being of opposite polarity to other of said zones whereby the main current return is through the negative feeder, and means for altering at will the polarity of any zone of the trolley wire independently of all the other zones.

6. In a system of electrical distribution of a D. C. electric railway, a source of power, a balancing means including a neutral balancing connection to the track in combination with a zoned line wherein each zone is connected by a separate feeder to the source of power.

7. In a system of electrical distribution for a D. C. electric railway, a source of power, a balancing set comprising a plurality of series connected direct current generators, in combination with a zoned line wherein each zone is connected to said source of power by a feeder, and switch means to reverse the polarity of any zone at will independently of all the other zones.

8. In a D. C. electric railway system, a source of power, a single track, balancing means including a balancing connection to the track, in combination with mutually insulated trolley wire sections or zones for said track, each of said sections or zones being connected to the source of power by a separate feeder whereby the main return current path is through the negative feeder.

9. In an electric railway system of the D. C. type, a zoned trolley line each zone having a separate feeder, a source of D. C. power, distributing busses connected to said source, feeder panels having switch means associated therewith, said switch means being adapted to connect any feeder to either the positive or negative bus, independently of the other feeders.

10. In an electric railway system of the D. C. type, a zoned trolley line each zone having a separate feeder, a source of D. C. power, distributing busses connected to said source, feeder panels having switch means associated therewith, said switch means being adapted to connect any feeder to either the positive or negative bus, independently of the other feeders, in combination with balancing means, and a common ground connection for the system, said balancing means being connected to said ground connection.

11. In an electric railway system of the D. C. type, a zoned trolley line each zone having a separate feeder, a source of D. C. power, distributing busses connected to said source, feeder panels having switch means associated therewith, said switch means being adapted to connect any feeders to either the positive or negative bus, independently of the other feeders, and a ground connection having a balancing connection connected therewith.

12. In an electric railway system, a source of power, positive and negative feeders connected thereto, mutually insulated trolley line zones, some of which are of opposite polarity to others, all the trolley wires in each zone being at substantially the same potential whereby their insulation from the ground need be no greater than in a single polarity feeding system in which the cars are run at the same potential, and whereby no insulation is required between trolley wires within the zone.

13. In an electric railway system, a source of power positive and negative feeders connected thereto, mutually insulated trolley line zones, some of which are of opposite polarity to others, all the trolley wires in each zone being at substantially the same potential whereby their insulation from the ground need be no greater than in a single polarity feeding system in which the cars are run at the same potential, and whereby no insulation is required between trolley wires within the zone, in combination with means to reverse the polarity of any zone at will independently of all the other zones.

14. The method of changing over an electric railway from the single polarity feeding system to a double polarity feeding system, comprising breaking the trolley line into a plurality of mutually insulated zones, connecting each zone through a separate feeder and a reversible switch means to the source of power, and, at the moment for changing over, reversing some of said switch means whereby some zones will be of opposite polarity to others.

In testimony whereof we have signed our names to this specification.

CHARLES G. ADSIT.
CHARLES E. BENNETT.